H. BOLAS.
SEAPLANE OR AEROPLANE.
APPLICATION FILED MAR. 7, 1919.
1,304,652.
Patented May 27, 1919.
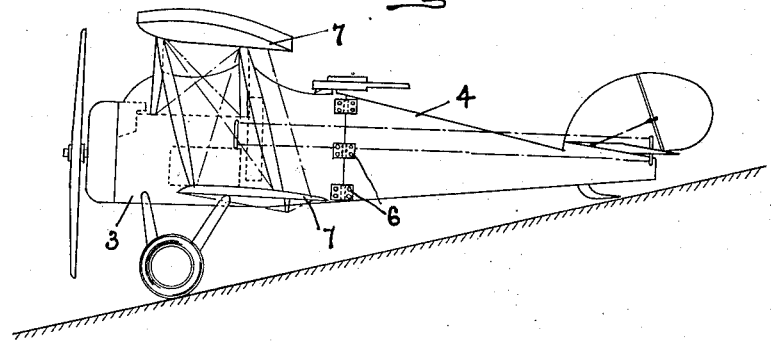
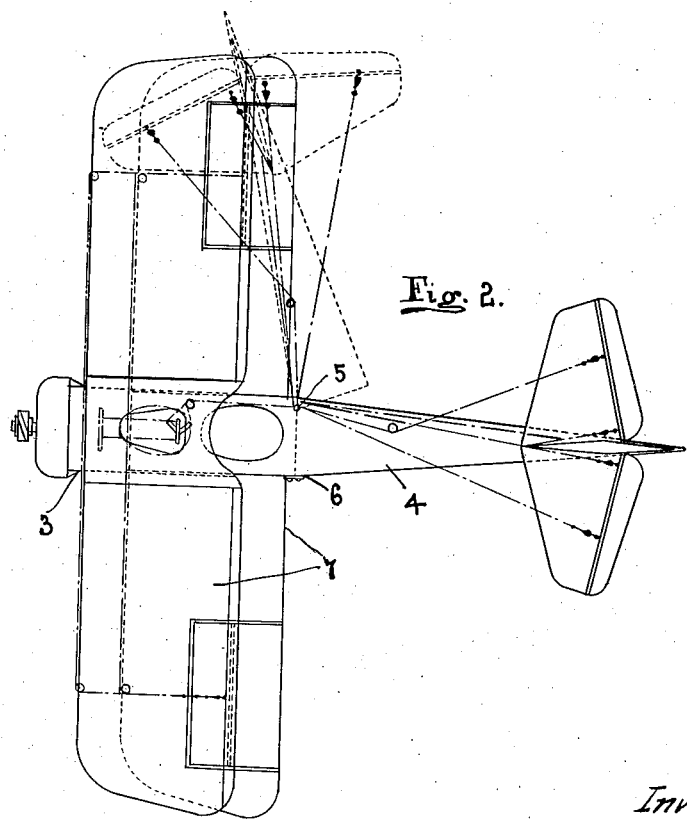
Inventor
Harold Bolas
by Lawrence Langner
Attorney

UNITED STATES PATENT OFFICE.

HAROLD BOLAS, OF BRISLINGTON, BRISTOL, ENGLAND.

SEAPLANE OR AEROPLANE.

1,304,652.   Specification of Letters Patent.   Patented May 27, 1919.

Application filed March 7, 1919. Serial No. 281,254.

*To all whom it may concern:*

Be it known that I, HAROLD BOLAS, a subject of the King of Great Britain, residing at Belmont Road, Brislington, Bristol, in the county of Gloucester, England, have invented a new and useful Improvement in Seaplanes or Aeroplanes; and I do hereby declare the following to be a full, clear, and exact description of the same.

This invention has reference to improvements in or connected with seaplanes or aeroplanes, and has for its object to facilitate and improve the carriage and transit more particularly of seaplanes on shipboard.

The invention further has as its object to simplify the construction, arrangement and operation of the hinged section as contrasted with that of existing aircraft wherein the main planes are hinged for folding, the present invention dispensing with any hinging of the main planes.

The invention consists of a seaplane or aeroplane characterized by the provision of a hinged fuselage, whereby the rear section of the fuselage together with the tail of the machine can be folded so as to lie adjacent to, beneath or within the main plane or planes.

The invention will now be described with reference to the accompanying drawings which illustrate one means of carrying it into practice in which:—

Figure 1 is a side elevation of an aeroplane, and

Fig. 2 is a plan of same.

The fuselage is formed in two sections, a forward section 3 and a rear section 4, the sections 3 and 4 of the fuselage being connected together at the one side by means of the hinges 5 and secured together upon the opposite side to that of the hinge by means of the fish plates 6. Instead of the fish plates we could employ locking bolts or pins or any other suitable device. When it is desired to fold the machine for carriage or transit, more especially for seaplanes when carried on the deck of a cruiser or other vessel, the fish plates 6 or other fastening device are unfastened to release the connection at the one side of the abutting sections 3 and 4 of the fuselage and the rear or tail section 4 of the fuselage together with the tail plane or planes, rudder and other appendages is turned about the hinges 5 until the rear section 4 and the tail are located adjacent to, beneath or within the main plane or planes 7 according to the type of aircraft to which this invention is applied. The folded position of the fuselage is seen by reference to the dotted line position of the rear section 4 in Fig. 2. Positioning struts or members may be provided if necessary, to accurately locate and fix the position of the folded section 4.

An especial advantage of this method of folding seaplanes or aeroplanes to reduce their deck of storage room, is that no hinging or weakening of the main plane or planes is entailed, with the consequence that there is no interference with the vital strength of the main plane or planes during a flight, which might arise when the said planes are hinged or otherwise jointed.

It will further be seen that no alteration in the strutting or tensioning of the main plane or planes is necessitated by the employment of this invention.

What I claim is:—

1. A seaplane or aeroplane having a two part fuselage, pivoting means between the two parts, whereby the rear section of the fuselage together with the tail of the machine can be folded horizontally so as to lie adjacent to the plane.

2. A seaplane or aeroplane having a two part fuselage, a hinge on one side wall of the fuselage and connecting the two parts thereof, whereby the rear section of the fuselage together with the tail of the machine can be folded horizontally so as to lie adjacent to the plane.

In testimony whereof, I have signed my name to this specification.

HAROLD BOLAS.